(12) United States Patent
Mondal et al.

(10) Patent No.: US 12,524,924 B2
(45) Date of Patent: Jan. 13, 2026

(54) GENERATION OF MICROSTRUCTURAL IMAGES OF TITANIUM ALLOYS AS A FUNCTION OF HEAT TREATMENT CONDITIONS USING CONDITIONAL GENERATIVE ADVERSARIAL NETWORKS

(71) Applicant: RTX Corporation, Farmington, CT (US)

(72) Inventors: Sudeepta Mondal, Bristol, CT (US); Brett Israelsen, Kaysville, UT (US); Ryan B. Noraas, Hartford, CT (US); Kishore K. Reddy, Farmington, CT (US)

(73) Assignee: RTX CORPORATION, Farmington, CT (US)

( * ) Notice: Subject to any disclaimer, the term of this patent is extended or adjusted under 35 U.S.C. 154(b) by 171 days.

(21) Appl. No.: 18/345,577

(22) Filed: Jun. 30, 2023

(65) Prior Publication Data

US 2025/0005806 A1   Jan. 2, 2025

(51) Int. Cl.
| | |
|---|---|
| *G06F 30/27* | (2020.01) |
| *B33Y 50/00* | (2015.01) |
| *G06F 18/2415* | (2023.01) |
| *G06N 3/0475* | (2023.01) |
| *G06T 7/00* | (2017.01) |

(Continued)

(52) U.S. Cl.
CPC .............. *G06T 11/00* (2013.01); *B33Y 50/00* (2014.12); *G06F 18/2415* (2023.01); *G06F 30/27* (2020.01); *G06N 3/0475* (2023.01); *G06T 7/0002* (2013.01); *G06F 2119/08* (2020.01);

(Continued)

(58) Field of Classification Search
None
See application file for complete search history.

(56) References Cited

U.S. PATENT DOCUMENTS

| | | | |
|---|---|---|---|
| 11,562,807 B2 | 1/2023 | Maiti et al. | |
| 2020/0089826 A1* | 3/2020 | Liu | G06F 30/27 |

(Continued)

FOREIGN PATENT DOCUMENTS

| | | | | |
|---|---|---|---|---|
| CN | 113870373 A | * | 12/2021 | G06F 30/20 |
| CN | 114283900 A | | 4/2022 | |

OTHER PUBLICATIONS

Boyce, B L; Microstructural Black Swans; Sep. 2022; 2022 IOP Conf. Ser.: Mater. Sci. Eng.; p. 1-8; https://iopscience.iop.org/article/10.1088/1757-899X/1249/1/012004/pdf (Year: 2022).*

(Continued)

*Primary Examiner* — Joni Hsu
(74) *Attorney, Agent, or Firm* — CANTOR COLBURN LLP

(57) ABSTRACT

The present disclosure provides for the generation of microstructural images of components (e.g., titanium alloys) using machine learning frameworks. More particularly, the present disclosure provides for the generation of microstructural images of components (e.g., titanium alloys) as a function of heat treatment conditions using conditional generative adversarial networks. The present disclosure advantageously provides ways to accelerate component designs (e.g., titanium alloy designs) by developing generative models which can produce synthetic yet realistic microstructures conditioned on heat treatment conditions.

15 Claims, 2 Drawing Sheets

(51) Int. Cl.
     *G06T 11/00*     (2006.01)
     *G06F 119/08*     (2020.01)

(52) U.S. Cl.
     CPC ............... *G06T 2207/20081* (2013.01); *G06T 2207/20084* (2013.01)

(56) References Cited

U.S. PATENT DOCUMENTS

2021/0357555 A1* 11/2021 Liu .................. G06F 30/27
2022/0170901 A1   6/2022 Roy et al.
2023/0076947 A1*  3/2023 Rasmus-Vorrath ... G01J 1/4228

OTHER PUBLICATIONS

Extended European Search Report corresponding to EP Application No. 24173013.4; Issue Date, Jul. 10, 2024; 8 pages.
Howland et al. "Parameters, Properties, and Process: Conditional Neural Generation of Realistic SEM Imagery Toward ML-Assisted Advanced Manufacturing", Jan. 24, 2023, 10 pages.
Iyer et al. "A Conditional Generative Model for Predicting Material Microstructures from Processing Methods", Oct. 4, 2019, 6 pages.
Karras et al. "A Style-Based Generator Architecture for Generative Adversarial Networks", Mar. 29, 2019, 13 pages.

* cited by examiner

GENERATION OF MICROSTRUCTURAL IMAGES OF TITANIUM ALLOYS AS A FUNCTION OF HEAT TREATMENT CONDITIONS USING CONDITIONAL GENERATIVE ADVERSARIAL NETWORKS

STATEMENT OF FEDERAL SUPPORT

This invention was made with Government support under Contract FA8650-21-2-5269 awarded by the United States Air Force. The Government has certain rights in this invention.

TECHNICAL FIELD

The present disclosure relates to the generation of microstructural images of components (e.g., titanium alloys) using machine learning frameworks and, more particularly, to the generation of microstructural images of components (e.g., titanium alloys) as a function of heat treatment conditions using conditional generative adversarial networks.

BACKGROUND

In general, the microstructure of manufactured components can play an important role in understanding process-structure-property relationships in the design of titanium alloys. However, experimentally obtaining microstructural images for a wide range of heat treatment conditions can be expensive, which limits the design space of exploration.

BRIEF DESCRIPTION

The present disclosure provides for the generation of microstructural images of components (e.g., titanium alloys) using machine learning frameworks. More particularly, the present disclosure provides for the generation of microstructural images of components (e.g., titanium alloys) as a function of heat treatment conditions using conditional generative adversarial networks.

The present disclosure advantageously provides ways to accelerate component designs (e.g., titanium alloy designs) by developing generative models which can produce synthetic yet realistic microstructures conditioned on heat treatment conditions.

The present disclosure provides for a method for the generation of microstructural images of a component including providing a machine learning framework with user-specified heat treatment conditions of a component, and utilizing the machine learning framework to generate microstructural images of the component as a function of the user-specified heat treatment conditions of the component.

In addition to one or more of the features described, or as an alternative to any of the foregoing embodiments, the component comprises a titanium alloy.

In addition to one or more of the features described, or as an alternative to any of the foregoing embodiments, the machine learning framework comprises utilizing a conditional generative adversarial network.

In addition to one or more of the features described, or as an alternative to any of the foregoing embodiments, the machine learning framework generates the microstructural images of the component utilizing a range of user-specified heat treatment conditions of the component.

In addition to one or more of the features described, or as an alternative to any of the foregoing embodiments, the generated microstructural images of the component comprise synthetic yet realistic microstructure images conditioned on the heat treatment conditions of the component.

In addition to one or more of the features described, or as an alternative to any of the foregoing embodiments, the component is a test specimen or a full-scale component.

In addition to one or more of the features described, or as an alternative to any of the foregoing embodiments, the machine learning framework allows high fidelity knowledge capture and virtual prediction of microstructure in substantially any location of the component.

In addition to one or more of the features described, or as an alternative to any of the foregoing embodiments, further including utilizing the generated microstructural images to predict life or risk assessments of the component.

In addition to one or more of the features described, or as an alternative to any of the foregoing embodiments, further including utilizing the machine learning framework to generate variations of microstructural images of the component to facilitate a user to understand uncertainty and frequency of rare events of the component.

In addition to one or more of the features described, or as an alternative to any of the foregoing embodiments, the generation of each microstructural image takes less than one second.

In addition to one or more of the features described, or as an alternative to any of the foregoing embodiments, the user-specified heat treatment conditions of the component are represented in an embedded space, and are used as conditional inputs to a mapping network, along with random noise to generate a latent space distribution for a class of images in a training set, and latent space vectors are then transformed as inputs to a synthesis network, which generates images at different resolutions for different random noise inputs.

In addition to one or more of the features described, or as an alternative to any of the foregoing embodiments, where during a training phase, the machine learning framework learns to distinguish fake images from real ones, along with classifying the generated images into class labels seen in the training set.

In addition to one or more of the features described, or as an alternative to any of the foregoing embodiments, further including utilizing the generated microstructural images to infer statistical representations of microstructural properties of the component.

In addition to one or more of the features described, or as an alternative to any of the foregoing embodiments, the machine learning framework comprises utilizing a conditional generative modeling approach.

In addition to one or more of the features described, or as an alternative to any of the foregoing embodiments, the machine learning framework comprises utilizing a trained conditional generative model.

In addition to one or more of the features described, or as an alternative to any of the foregoing embodiments, the machine learning framework generates microstructural images of the component for new conditions outside a training set.

The above described and other features are exemplified by the following figures and detailed description.

Any combination or permutation of embodiments is envisioned. Additional features, functions and applications of the disclosed systems, assemblies and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

The following figures are example embodiments wherein the like elements are numbered alike.

Features and aspects of embodiments are described below with reference to the accompanying drawings, in which elements are not necessarily depicted to scale.

Figure 1:
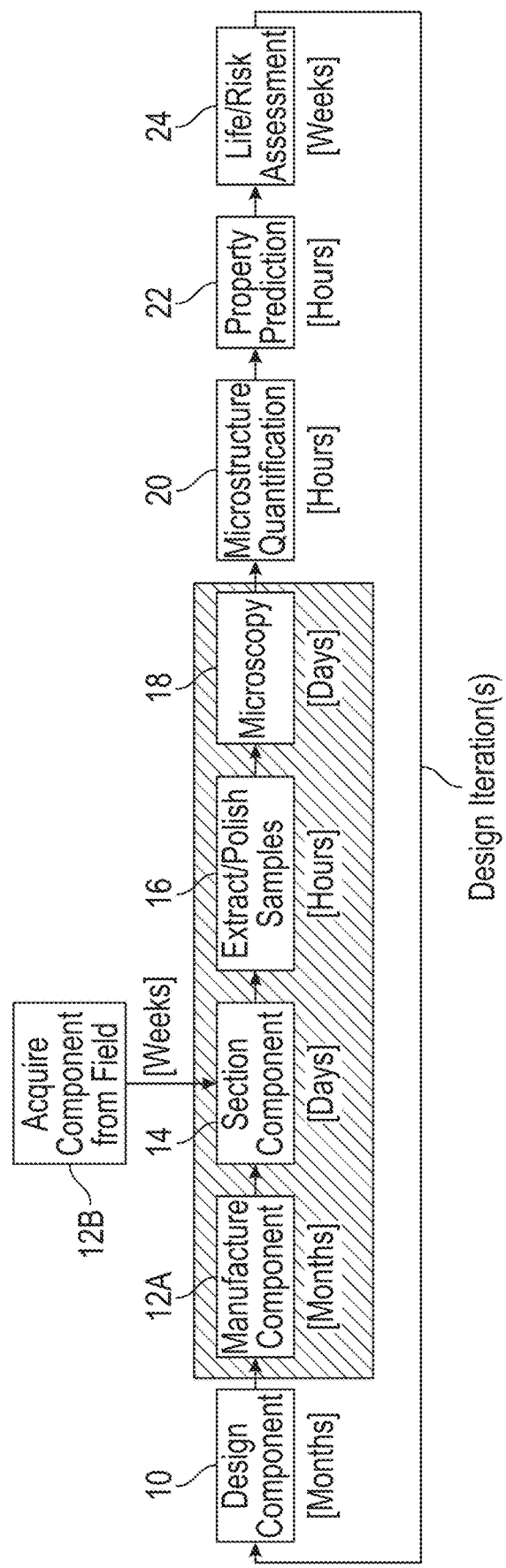
Figure 2:
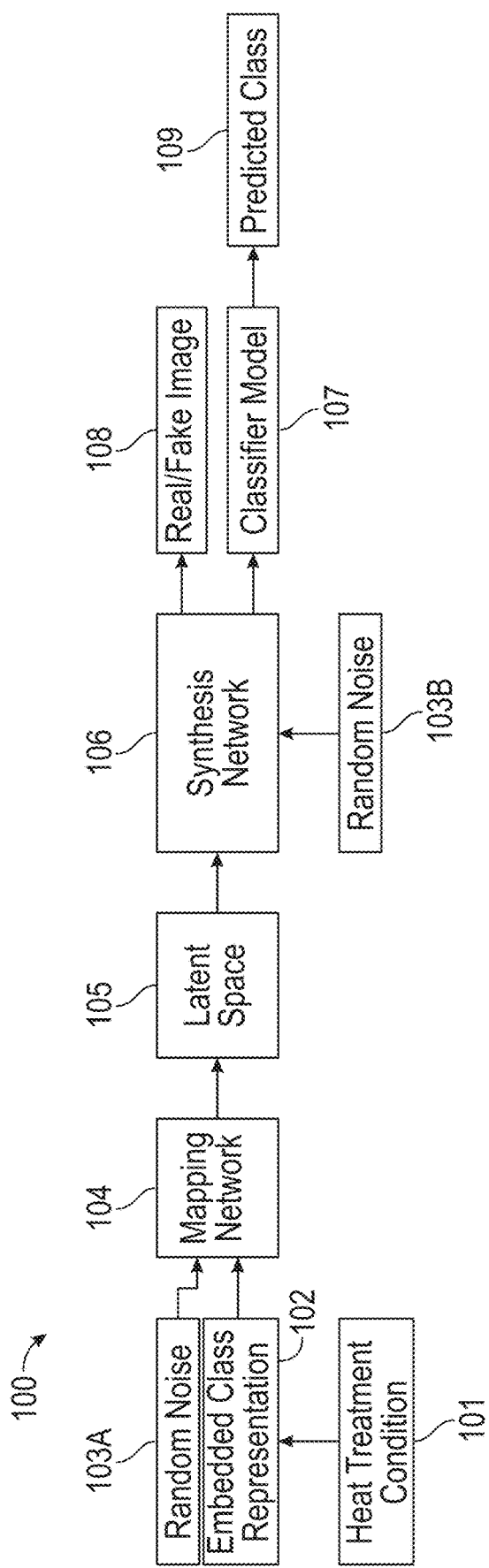
Figure 3:
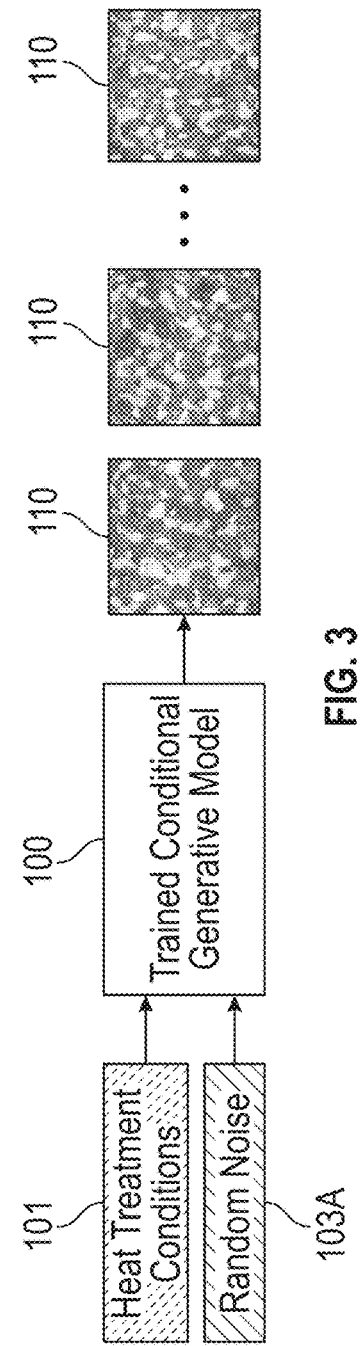

Example embodiments of the present disclosure are further described with reference to the appended figures. It is to be noted that the various features, steps, and combinations of features/steps described below and illustrated in the figures can be arranged and organized differently to result in embodiments which are still within the scope of the present disclosure. To assist those of ordinary skill in the art in making and using the disclosed systems, assemblies and methods, reference is made to the appended figures, wherein:

FIG. 1 is a process diagram for conventional component design and evaluation; it is noted that long lead times and high cost of data can restrict engineering design iterations;

FIG. 2 is a schematic of the overall framework of an example conditional generative modeling approach for microstructural image generation of a component, according to the present disclosure; and FIG. 3 is a schematic of an operational workflow of an example conditional generative modeling approach for microstructural image generation of a component, according to the present disclosure, and depicts the close to real-time implementation.

DETAILED DESCRIPTION

The example embodiments disclosed herein are illustrative of methods for the generation of microstructural images of a component, and systems of the present disclosure and methods/techniques thereof. It should be understood, however, that the disclosed embodiments are merely examples of the present disclosure, which may be embodied in various forms. Therefore, details disclosed herein with reference to example methods and associated processes/techniques of use are not to be interpreted as limiting, but merely as the basis for teaching one skilled in the art how to make and use the methods/systems and/or alternative methods/systems of the present disclosure.

The present disclosure provides for the generation of microstructural images of components (e.g., titanium alloys) using machine learning frameworks. More particularly, the present disclosure provides for the generation of microstructural images of components (e.g., titanium alloys) as a function of heat treatment conditions using conditional generative adversarial networks.

As noted, experimentally obtaining microstructural images for a wide range of heat treatment conditions can be expensive, which limits the design space of exploration. The present disclosure advantageously provides ways to accelerate component designs (e.g., titanium alloy designs) by developing generative models which can produce synthetic yet realistic microstructures conditioned on heat treatment conditions.

FIG. 1 is a process diagram for conventional component design 10 and evaluation; it is noted that long lead times and high cost of data can restrict engineering design iterations. As shown in FIG. 1, at step 12A the component is manufactured or at step 12B the component is acquired from the field. At step 14, the component is sectioned, and at step 16 some samples are extracted and/or polished. At step 18, some microscopy is performed, followed by microstructure quantification at step 20. Step 22 provides property predictions, and step 24 provides life/risk assessments of the component.

It is noted that some conventional standards for microstructure analysis have largely relied on domain expertise, institutional knowledge, and visual conformity to established materials specifications. Across the industry it is standard practice to report metrics like average grain size and associated area fraction.

Moreover, some material microstructure models typically predict changes to these scalar metrics (e.g., average grain size). Complex microstructure features and spatial interactions are generally ignored or at best, homogenized.

Furthermore, long lead times and the high cost of data can restrict engineering design iterations (e.g., see FIG. 1). As such, a higher number of configurations is substantially impossible to manufacture and physically evaluate. Additionally, some current microstructure characterization techniques assess small volumes of material, which can increase uncertainty in full size components.

Conventional practice also provides that some typical descriptions of alpha-beta titanium microstructures include grain area fraction, diameter and less commonly the alpha lath thickness.

The present disclosure advantageously provides that a machine learning approach can allow high fidelity knowledge capture and virtual prediction of microstructure in substantially any location in substantially any part. Moreover, it is noted that repeated sampling from machine learning models can generate variations of microstructures which can help quantify and understand the uncertainty in microstructural features and frequency of rare events.

FIG. 2 is a schematic of the overall framework 100 of an example conditional generative modeling approach for microstructural image generation of a component, according to the present disclosure.

A goal of the present disclosure is to generate realistic microstructure images 110 (FIG. 3) as a function of user-specified heat treatment conditions 101.

It is noted that generative artificial intelligence models (e.g., StyleGAN or the like) have found success in generating some synthetic high resolution images. These models can be conditioned on controlling parameters, which can be leveraged to generate class conditional image outputs.

It is noted that the microstructure of manufactured components can play an important role in understanding process-structure-property relationships in the design of some components (e.g., titanium alloys). However, experimentally obtaining microstructural images for a wide range of heat treatment conditions can be expensive (utilizing conventional methods), which limits the design space of exploration. The present disclosure aims to accelerate the component design (e.g., titanium alloy design) by developing generative models 100 which can produce synthetic but realistic microstructural images 110 conditioned on user-specified heat treatment conditions 101.

The user-specified heat treatment conditions 101 can be represented in an embedded space 102, which can be used as conditional inputs to a mapping network 104, along with random noise 103A to generate the latent space distribution 105 for a class of images in the training set. The latent space vectors from latent space 105 are then transformed to serve as inputs to the synthesis network 106, which generates images at different resolutions for different random noise inputs 103B. During the training phase, the network 106 learns to distinguish fake images from the real ones at step 108, along with classifying the generated images via a classifier model 107 into a set of class labels (predicted class 109).

FIG. 3 is a schematic of an operational workflow of an example conditional generative modeling approach 100 for microstructural image generation of a component, according to the present disclosure, and depicts the close to real-time implementation.

During operation, an end-user should specify the heat treatment conditions 101 for the component (e.g., titanium alloy component).

As shown in FIG. 3, the conditional generative model 100 provides synthetic microstructure images 110 for the input heat treatment conditions 101. The generated images 110 can be utilized to infer statistical representation of microstructural properties of the component.

The generated images 110 resemble the true images, thereby making this approach 100 the most realistic synthetic microstructural feature generator available to date for such applications. Other conventional modeling approaches are significantly lower fidelity in terms of the generated outputs, with the end user resorted to having high level statistical descriptions of features such as grain diameter, area fraction without the level of details the generated images 110 from the method/framework 100 provided by the present disclosure.

It is advantageously noted that the implementation of this method/framework 100 is extremely fast. The generation of each microstructure image 110 can take less than one second. As shown in Table 1 below, this is several orders of magnitude speed-up when compared to the traditional approach of material processing and characterization (e.g., using scanning electron microscopy (SEM) imaging).

TABLE 1

ML Method is the example method 100 of the present disclosure:

| Task | Current Method | ML Method |
| --- | --- | --- |
| Image generation | Hours | Seconds |
| Image quantification | Hours | Seconds |
| Large volume characterization (in³+) | N/A (not industrially feasible) | Minutes |
| Replace all/part microstructure characterization | 3-6 months | Hours |

As such, the present disclosure provides a method/system 100 of synthetic microstructural image 110 generation, conditioned on heat treatment conditions 101. The designed method/system 100 utilizes generative adversarial networks for generating realistic microstructural images 110, coupled with a novel embedding scheme discussed above which represents heat treatment conditions in a latent space 105, and that supports image 110 generation for heat treatment conditions outside the training dataset.

It is noted that some conventional generative models used for synthetic microstructural image generation can only handle heat treatment conditions as present in the training set, and they cannot generate microstructures for new conditions outside the training set. This limits their applicability in exploring a range of heat treatment conditions. The deployment of the designed method/framework 100 of the present disclosure can help in generating out of dataset microstructural images which can advance component (e.g., titanium-alloy component) design.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Although the assemblies, systems and methods of the present disclosure have been described with reference to example embodiments thereof, the present disclosure is not limited to such example embodiments and/or implementations. Rather, the assemblies, systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:
1. A method for the generation of microstructural images of a component comprising:
providing a machine learning framework with user-specified heat treatment conditions of a component; and utilizing the machine learning framework to generate microstructural images of the component as a function of the user-specified heat treatment conditions of the component,
wherein the user-specified heat treatment conditions of the component are represented in an embedded space, and are used as conditional inputs to a mapping network, along with random noise to generate a latent space distribution for a class of images in a training set, and latent space vectors are then transformed as inputs to a synthesis network, which generates images at different resolutions for different random noise inputs.

2. The method of claim 1, wherein the component comprises a titanium alloy.

3. The method of claim 1, wherein the machine learning framework comprises utilizing a conditional generative adversarial network.

4. The method of claim 1, wherein the machine learning framework generates the microstructural images of the component utilizing a range of user-specified heat treatment conditions of the component.

5. The method of claim 1, wherein the generated microstructural images of the component comprise synthetic yet realistic microstructure images conditioned on the heat treatment conditions of the component.

6. The method of claim 1, wherein the component is a test specimen or a full-scale component.

7. The method of claim 1, wherein the machine learning framework allows high fidelity knowledge capture and virtual prediction of microstructure in substantially any location of the component.

8. The method of claim 1 further comprising utilizing the generated microstructural images to predict life or risk assessments of the component.

9. The method of claim 1 further comprising utilizing the machine learning framework to generate variations of microstructural images of the component to facilitate a user to understand uncertainty and frequency of rare events of the component.

10. The method of claim 1, wherein the generation of each microstructural image takes less than one second.

11. The method of claim 1, wherein during a training phase, the machine learning framework learns to distinguish fake images from real ones, along with classifying the generated images into class labels seen in the training set.

12. The method of claim 1 further comprising utilizing the generated microstructural images to infer statistical representations of microstructural properties of the component.

13. The method of claim 1, wherein the machine learning framework comprises utilizing a conditional generative modeling approach.

14. The method of claim 1, wherein the machine learning framework comprises utilizing a trained conditional generative model.

15. The method of claim 1, wherein the machine learning framework generates microstructural images of the component for new conditions outside a training set.

* * * * *